United States Patent [19]
Ward et al.

[11] Patent Number: 4,938,913
[45] Date of Patent: Jul. 3, 1990

[54] SOLID PHASE DEFORMATION PROCESS

[75] Inventors: Ian M. Ward, Bramhope; Brain Parsons, Kent, both of England; Ja'Faar B. Sahari, Selangor, Malaysia

[73] Assignee: National Research Development Corporation, United Kingdom

[21] Appl. No.: 289,393

[22] Filed: Dec. 16, 1988

Related U.S. Application Data

[63] Continuation of Ser. No. 144,580, Dec. 30, 1987, abandoned, which is a continuation of Ser. No. 723,553, Apr. 15, 1985, abandoned.

[30] Foreign Application Priority Data

Apr. 13, 1984 [GB] United Kingdom ............... 8409656

[51] Int. Cl.$^5$ .............................................. B29C 67/24
[52] U.S. Cl. .................................. 264/570; 264/320; 264/323; 264/331.17; 526/352
[58] Field of Search ............... 264/209.1, 320, 323, 264/331.17, 570; 526/352; 528/502

[56] References Cited

U.S. PATENT DOCUMENTS

| | | | |
|---|---|---|---|
| 3,507,941 | 4/1970 | Kies et al. | 264/570 |
| 3,642,976 | 2/1972 | Buckley et al. | 264/323 |
| 3,714,320 | 1/1973 | Shaw | 264/323 |
| 3,944,536 | 3/1976 | Lupton et al. | 526/352 |

FOREIGN PATENT DOCUMENTS

| | | |
|---|---|---|
| 1910054 | 11/1969 | Fed. Rep. of Germany . |
| 2310938 | 9/1973 | Fed. Rep. of Germany . |
| 3212605 | 11/1982 | Fed. Rep. of Germany . |
| 435697 | 10/1967 | Switzerland . |
| 656300 | 8/1951 | United Kingdom . |
| 1052090 | 12/1966 | United Kingdom . |
| 1201485 | 8/1970 | United Kingdom . |
| 1220182 | 1/1971 | United Kingdom . |
| 1311885 | 3/1973 | United Kingdom . |
| 1327140 | 8/1973 | United Kingdom . |
| 1480479 | 7/1977 | United Kingdom . |
| 2060469 | 5/1981 | United Kingdom . |

OTHER PUBLICATIONS

Keller, A. "Routes to High Modulus by Ultra-Orientation of Flexible Molecules," pp. 321–355.

Yasuniwa, M. et al. "Melting and Crystallization Process of Polyethylene Under High Pressure," *Polymer Journal*, vol. 14, No. 5 (1973), pp. 526–533.

"Phenomenology of Chain-Extended Crystallization in Polyethylene," *Philosophical Magazine*, vol. 29, No. 4, p. 941.

Zachariades, A. E., "Recent Developments in Ultramolecular Orientation of Polyethylene by Solid State Extrusion," pp. 77–115.

Bassett, D.C. "The Crystallization of Polyethylene at High Pressures," pp. 115–150.

D. C. Bassett, "Chain-Extended Polyethylene in Context: a Review", Polymer, 1976, vol. 17, Jun., pp. 460–470.

G. E. Attenburrow and D. C. Bassett, "Direct Optical and STEM Observations of the Drawing of Pressure-Crystallized Polyethylene", POLYMER 1979, vol. 20, Nov., pp. 1312–1315.

(List continued on next page.)

*Primary Examiner*—Jeffery Thurlow
*Assistant Examiner*—Leo B. Tentoni
*Attorney, Agent, or Firm*—Finnegan, Henderson, Farabow, Garrett & Dunner

[57] ABSTRACT

A process for the deformation of a workpiece of an orientable, thermoplastic polymer by passage in the solid phase through a die having both an entry side and an exit side, which process includes providing the workpiece of the orientable, thermoplastic polymer which is initially present, at least in part, in an extended chain crystalline morphology at the entry side of the die; causing the workpiece to deform in the solid phase through the die; and collecting the deformed workpiece from the exit side of the die.

16 Claims, 1 Drawing Sheet

OTHER PUBLICATIONS

G. E. Attenburrow, D. C. Bassett, "On the Plastic Deformation of Chain-Extended Polyethylene", Journal of Materials Science 12 (1977), pp. 192–200.

G. E. Attenburrow, D. C. Bassett, "Compliances and Failure Modes of Oriented Chain-Extended Polyethylene", pp. 2679–2687.

John M. Lupton and James W. Regester, "Physical Properties of Extended-Chain High-Density Polyethylene", Journal of Applied Polymer Science, vol. 18, pp. 2407–2425.

Abstracts, The Fourth Cleveland Symposium on Macromolecules: Irreversible Deformation of Polymers, H. H. Chuah and R. S. Porter, "Solid-State Extrusion of Chain-Extended Polyethylene".

Hoe Hin Chuah and Roger S. Porter, "Solid-State Extrusion of Chain-Extended Polyethylene", Journal of Polymer Science: Polymer Physics Edition, vol. 22, 1353–1365 (1984), pp. 1354–1365.

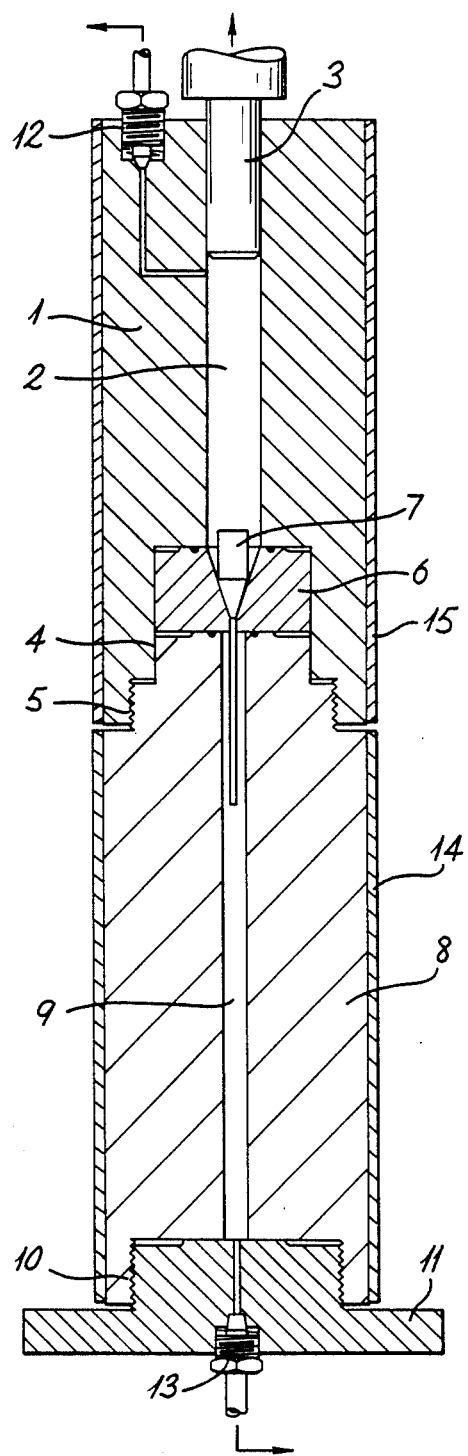

SOLID PHASE DEFORMATION PROCESS

This application is a continuation of application Ser. No. 07/144,580, filed Dec. 30, 1987, now abandoned, which is a continuation of Ser. No. 06/723,553, filed Apr. 15, 1985, now abandoned.

This invention relates to solid phase deformation processes; more particularly, this invention relates to the solid phase deformation of orientable, semi-crystalline, thermoplastic polymeric materials; and to improved polymeric materials obtained thereby.

BACKGROUND OF THE INVENTION

During the last twenty years, a very substantial amount of research has been effected into the improvement of, principally, the mechanical properties of flexible polymers by orientation. The required very high orientation of the molecular chains of flexible polymers, notably linear polyethylene, may be obtained either by preventing the formation of chain folded crystallites, as with precipitation from solution in an extensional flow regime, or by transforming a previously chain folded morphology into one comprising extended molecular chains, as with mechanical deformation: see, for example, our UK Patent Nos. 1480479 and 2060469B.

The latter class of procedures has the substantial advantage that, particularly in the case of filament spinning and drawing, existing industrial practice can integrate the procedures with comparatively small change. A disadvantage, however, notably in relation to polymeric stock of substantial cross-section is the amount of processing space necessarily required by the large deformation ratios which are dictated.

This invention seeks to provide a solid phase deformation process in which higher effective deformation, at given deformation ratios, than was hitherto available is manifest.

SUMMARY OF THE INVENTION

According, therefore, to one aspect of this invention there is provided a process for the deformation of a workpiece comprising an orientable, thermoplastic polymer by passage in the solid phase through a die having both an entry side and an exit side, which process comprises providing the workpiece comprising the orientable, thermoplastic polymer which is initially present, at least in part, in an extended chain crystalline morphology at the entry side of the die; causing the workpiece to deform in the solid phase through the die; and collecting the deformed workpiece from the exit side of the die.

Preferably, the process effects a reduction in the bulk cross-sectional area of the workpiece. (By 'bulk cross-sectional area' is meant the area of the bulk of the workpiece normal to the machine direction.) Preferably, the die is a reducing die.

DETAILED DESCRIPTION OF THE INVENTION

Not all polymers are capable of existing with an extended chain crystalline morphology; however, the process of the present invention is applicable to linear polyethylene and fluorinated vinyl polymers; for example polyvinylidene fluoride and polytetrafluoroethylene, the latter existing in an extended chain crystalline morphology at standard temperature and pressure. From a commercial standpoint, the process of the present invention is of particular importance in relation to linear polyethylene, preferably having a weight average molecular weight ($\overline{M}_w$) from 50,000 to 3,000,000, especially from 100,000 to 1,500,000. In contrast to other solid phase deformation processes, the process of the present invention is facilitated by the use of high $\overline{M}_w$ polymers; for example, linear polyethylene having an $\overline{M}_w$ greater than 750,000. Where the process of the present invention is utilized in relation to polyvinylidene fluoride, it is desirable that the polymer has an $\overline{M}_w$ from 200,000 to 800,000, preferably 250,000 to 400,000.

The term "workpiece" as used herein includes bars, strips, rods, tubes and other cross-sections of solid or hollow stock. The term includes both billets and other forms of stock of greater length; indeed, continuous stock, which may be formed as the process is performed, may be utilised.

The orientable, semi-crystalline, thermoplastic workpieces used in the process of this invention may be filled. Examples of useful fibrous fillers include glass, asbestos, metal, carbon and ceramic whiskers, such as those formed from silicon carbide. Examples of useful laminar fillers include mica, talc and graphite flakes. Chalk and fly ash may also be included. The amount of filler which may advantageously be included depends on the nature of the filler, but up to 50% by weight, preferably less than 30%, especially less than 20% may be incorporated.

It is preferred that a major amount of the polymer is present in an extended chain crystalline morphology before the deformation process of this invention is effected.

In accordance with a preferred embodiment of this invention the workpiece is caused to deform through the reducing die in the solid phase by hydrostatically extruding it therethrough. Draw-assisted hydrostatic extrusion, as described in our UK Patent No. 1480479, may be utilised with advantage. The net hydrostatic pressure (that is, the difference between the applied extrusion pressure and the applied extrudate pressure which, as explained subsequently, need not be substantially standard pressure) for extrusion to occur will, at a given extrusion temperature, increase with increasing extrudate pressure and will, at a given extrudate pressure, decrease with increasing temperature. A value from 0.2 to 3.0 kbar, preferably from 0.5 to 2.0 kbar, for example 1 kbar, is found to be suitable.

It is also feasible to deform the workpiece by drawing it through the reducing die without hydrostatic pressure.

It is also preferred that the reducing die temperature is above the $T_g$ of the polymer but below the melting point of the polymer at the ambient pressure at which the deformation is effected. As the deformation temperature increases (and it may increase to high values where high ambient pressures are used, it being appreciated that the melting point of the polymer increases by approximately 20° C. for each kbar of applied pressure) above 200° C. process control becomes increasingly difficult. It is, therefore, preferred that the extrusion is effected at an atmospheric ambient pressure and at a temperature from 90° C. to 120° C., in the case of linear polyethylene. The polymer may also be dielectrically heated, as disclosed in EPA No. 0084274.

While nominal deformation ratios ($R_N$) of up to 50, for example 20, have been obtained with linear polyethylene it is a feature of the process of the present invention that more effective deformation is attained. That is, a given enhancement of a physical property may be attained at a lower deformation ratio by the present process. Accordingly, $R_N$ is suitably from 4 to 12, preferably from 5 to 10; for example 8.

This invention also provides a process as herein described wherein the extended chain crystalline morphology is first imparted to the polymer by subjecting the workpiece to a temperature and pressure at which the polymer crystallizes with this morphology. This aspect of the invention may be effected separately, as is preferred, or may be effected in the extrusion apparatus, as subsequently described, immediately prior to deformation, it being understood that the apparatus should be capable of withstanding a pressure of 5 kbar at a temperature of 275° C. Chain extended crystalline morphology is found to be imparted to the polymer at pressure above 3.5 kbar (but it is not usually necessary to exceed 4.8 kbar) and temperatures above 220° C. (in the case of linear polyethylene) and 207° (in the case of polyvinylidene fluoride).

The presence of chain extended crystalline morphology is manifest by an increased melting point (DSC) and a higher density. In the case of linear polyethylene these are, respectively, $>140°$ C. and $>0.98$ g cm$^{-3}$.

The invention also provides an oriented, semi-crystalline, thermoplastic polymer prepared by the process of the present invention. This invention further provides oriented linear polyethylene which has been deformed to a deformation ratio not greater than 20; for example 12, and which has an axial modulus of at least 15 GPa; for example, of at least 10 GPa.

Furthermore, this invention provides a set hydraulic cementitious or organic thermoset mass which incorporates an oriented polymer prepared by a process of the invention.

DESCRIPTION OF THE DRAWING

The invention will not be further described, by way of example, with reference to the accompanying drawing, in which:

the sole FIGURE represents an axial cross-section of the annealing and extrusion apparatus used in the process of the present invention.

In the drawing, the apparatus comprises a generally cylindrical hydrostatic extrusion vessel 1 containing an axially aligned chamber 2, having a diameter of 20 mm and an effective length of 170 mm, which is closed at an upstream end by an internally slidable piston 3 in a fluid-tight fit therewith which piston is connected externally to a load cell (not shown) of a universal testing machine. The downstream end of the chamber is formed with two, internal, axially symmetric shoulders 4 and 5 which are each threaded to receive a threaded conical reducing die 6 in which a workpiece 7 is seated and a threaded upstream end of an extrudate vessel 8 by which the reducing die is effectively clasped in position and which comprises an axially aligned extrudate chamber 9, having a diameter of 8 mm and an effective length of 220 mm. The downstream end of the extrudate vessel is formed with an internal shoulder 10 which is threaded to receive a threaded end closure 11. Both the extrusion and the extrudate vessels have a first and second port 12 and 13, respectively, which communicate with pressure varying systems (not shown); and are both provided with circumferential band heaters 14 and 15 enabling the tooling temperature to be maintained within 2° C.

The use of the apparatus is described in the following Example which illustrates the invention.

EXAMPLE

Preparation of the billet and its pressure annealing

High density polyethylene (Rigidex 006/60 ex BP Chemicals Ltd. $\overline{M}_w=135,000$; $\overline{M}_w=25,500$; "RIGIDEX" is a registered Trade Mark) was melt extruded into a billet mould and cooled slowly with isostatic compaction. A number of cylindrical billets were so produced having a density ca. 0.97 g cm$^{-3}$. A nose was then machined on each billet so that it would accurately mate with the reducing die as shown in the accompanying drawing. Three reducing dies having bore diameters of 2.5, 3.1 and 5.0 mm were used; the conical semi-angle was 15° in each case.

Each billet was, in turn, urged into position in the reducing die; the tooling was assembled as shown in the accompanying drawing; and the chambers filled with a silicone oil (DC 550 ex Dow Corning), and suitably bled. A hydro-pump was used to raise the oil pressure in both vessels to a mean value of 3 kbar at the ambient temperature, a slightly higher pressure being maintained in the extrusion vessel which was sufficient to retain the billet in position without its undergoing extrusion. Thereafter, the band heaters were energized, the heat causing expansion of the silicone oil and a further increase of pressure: at a temperature of 200° C. the pressure had attained 4.5 kbar. Heating was continued with the pressure being maintained at about 4.5 kbar, either by withdrawing the piston (though it is the primary purpose of the piston, in this phase of the process, to act as a static seal) or releasing some of the silicone oil via the ports, until an equilibrium temperature of 240° C. was attained. The billet was then annealed at this temperature and pressure for 1 hour, the whole procedure to the termination of annealing taking about 3 to 4 hours. The band heaters were next switched off and the extrusion vessel allowed to cool, while maintaining the pressure at 4.5 kbar, to about 160° C. After this, both the temperature and pressure were permitted gradually to fall; when the temperature had fallen to 100° C., the residual excess pressure was released by venting the ports.

Hydrostatic extrusion of the pressure annealed billet

The band heaters were re-energized, the silicone oil being raised to an equilibrium temperature of 100° C. Load was then applied to the piston to urge it into the extrusion vessel at a constant speed. The workpiece (or billet) was extruded through the die at an extrusion speed of up to 20 mm min$^{-1}$; for example, 5 mm min$^{-1}$.

In some of the experimental runs effected with others of the prepared billets a pressure was applied to both the extrusion and extrudate vessels to give a high ambient pressure, the back extrusion pressure in the extrudate vessel being maintained constant during extrusion by venting port 13.

At the termination of the extrusion, the temperature was, in each case, allowed to fall to below 100° C. before the excess pressure was released and the product extracted.

The axial modulus of the extruded products was determined by the 3-point bend method at strains $>0.1\%$ taking the response 10 seconds after application of the load. The results are shown in the following Table.

TABLE

| NOMINAL EXTRUSION RATIO ($R_N$) | EXTRUSION TEMPERATURE (°C.) | EXTRUDATE BACK PRESSURE (kbar) | AXIAL MODULUS (GPa) $(a)^1$ | $(b)^2$ |
|---|---|---|---|---|
| 5 | 100 | 0 | 15.9 | 7.9 |
| 10 | 100 | 0 | 32.6 | 17.5 |
| 10 | 140 | 2.0 | 33.8 | 18.3 |
| 10 | 160 | 3.0 | 33.7 | — |

[1] Pressure annealed billets
[2] Billets prepared and deformed in accordance with the disclosure of UK Patent No. 1480479

It will be apparent from the above results that pressure annealing effected before extrusion of the workpiece enables a much more effective deformation to be attained; that is, for a given deformation ratio a much greater increase in axial modulus is obtained. It will also be apparent that application of substantial pressure after annealing has no comparable effect.

We claim:

1. A solid phase deformation process comprising passage of an orientable, thermoplastic polymer through a die having both an entry side and an exit side, causing said polymer to deform in said solid phase through said die; and collecting said deformed polymer from said exit side of said die, wherein said thermoplastic polymer is linear polyethylene having a minimum molecular weight of 100,000 and prior to its passage through the die has a melting point (DSC) greater than 140° C. and a density greater than 0.98 g cm$^{-3}$ and is in an extended chain crystalline morphology.

2. A process according to claim 1 wherein the linear polyethylene has a maximum weight average molecular weight ($M_w$) of 3,000,000.

3. A process according to claim 2 wherein $\overline{M}_w$ is from 100,000 to 1,500,000.

4. A process according to claim 1 wherein the workpiece is formed as a bar, strip, rod or tube.

5. A process according to claim 1 wherein said polymer is filled.

6. A process according to claim 1 wherein the workpiece is hydrostatically extruded through said die.

7. A process according to claim 6 wherein the hydrostatic extrusion is draw-assisted hydrostatic extrusion.

8. A process according to claim 1 wherein the workpiece is drawn through said die.

9. A process according to claim 6, wherein the die temperature is above the $T_g$ of the polymer but below the melting point of the polymer at an ambient pressure at which the deformation is effected.

10. A process according to claim 9 wherein said ambient pressure at which the extrusion is effected is atmospheric pressure.

11. A process according to claim 1 wherein said die deforms said polymer at a deformation ratio is from 4 to 20.

12. A process according to claim 11 wherein said deformation ratio is from 5 to 10.

13. A process according to claim 1 wherein the extended chain morphology is first imparted to the polymer by subjecting the workpiece to a temperature and pressure at which the polymer crystallizes with this morphology.

14. A process according to claim 13 wherein the polymer is linear polyethylene and the workpiece is heated to a temperature above 220° C. while being maintained in the solid phase.

15. A process according to claim 13 wherein the workpiece is subjected to a pressure of at least 3.5 kbar.

16. A solid phase deformation process comprising passage of an orientable, thermoplastic polymer through a die having both an entry side and an exit side, causing said polymer to deform in said solid phase through said die and collecting said deformed polymer from said exit side of said die, wherein said thermoplastic polymer is linear polyethylene having a minimum molecular weight of 100,000 and prior to its passage through said die has a melting point (DSC) greater than 140° C. and a density greater than 0.98 g cm$^{-3}$ and is in an extended chain crystalline morphology to provide an oriented linear polyethylene which has been deformed to a deformation ratio less than 20 and which has an axial modulus of at least 10 Gpa.

* * * * *